US006748655B2

(12) United States Patent
Dickmann et al.

(10) Patent No.: US 6,748,655 B2
(45) Date of Patent: Jun. 15, 2004

(54) METHOD FOR PROFILING THE OUTER CIRCUMFERENTIAL FACE OF CYLINDER LINERS

(75) Inventors: Thomas Dickmann, Oberhausen (DE); Udo Kempken, Moers (DE); Erik Mertner, Hattingen (DE); Rolf Schattevoy, Wülfrath (DE)

(73) Assignee: Peak Werkstoff GmbH, Velbert (DE)

( * ) Notice: Subject to any disclaimer, the term of this patent is extended or adjusted under 35 U.S.C. 154(b) by 32 days.

(21) Appl. No.: 10/270,257

(22) Filed: Oct. 11, 2002

(65) Prior Publication Data

US 2003/0084567 A1 May 8, 2003

(30) Foreign Application Priority Data

Oct. 16, 2001 (DE) ........................................ 101 50 999

(51) Int. Cl.[7] .................................................. B23P 15/00

(52) U.S. Cl. .............................. 29/888.061; 29/888.06; 72/402; 72/398

(58) Field of Search ....................... 29/888.061, 888.06, 29/557, 558, 890.05, 890.046, 895.3, 895.31, 895.33; 72/402, 398; 123/193.2

(56) References Cited

U.S. PATENT DOCUMENTS

| | | | | |
|---|---|---|---|---|
| 3,768,290 A | | 10/1973 | Zatell | |
| 5,894,753 A | * | 4/1999 | Sachot et al. | 72/402 |
| 5,941,118 A | * | 8/1999 | Tseng | 72/370.04 |
| 6,123,052 A | * | 9/2000 | Jahn | 123/41.79 |
| 6,178,802 B1 | * | 1/2001 | Reynolds | 72/402 |
| 6,519,848 B2 | * | 2/2003 | Komazaki et al. | 29/888.061 |
| 6,640,765 B2 | * | 11/2003 | Land et al. | 123/193.2 |

FOREIGN PATENT DOCUMENTS

| | | |
|---|---|---|
| DE | 2735762 | 2/1979 |
| DE | 19958103 | 3/2001 |

* cited by examiner

*Primary Examiner*—I Cuda Rosenbaum
(74) *Attorney, Agent, or Firm*—Katten Muchin; Zavis Rosenman

(57) ABSTRACT

A method for producing, by forming techniques, an undercut profile in the outer circumferential face of cylinder liners to be cast in place in a crankcase, characterized by the introduction of a bracing inner core into the cavity of a cylinder liner, the introduction of the cylinder liner equipped with bracing inner core into a first forming die equipped on its working faces with a serrated profile, the pressing of the first forming die against the outer circumferential face of the cylinder liner, thus producing a complementary profile in the outer circumferential face, the introduction of the cylinder liner equipped with bracing inner core into a second forming die equipped on its working faces with a smooth surface, and the pressing of the second forming die against the outer circumferential face of the cylinder liner equipped with the complementary profile.

7 Claims, 7 Drawing Sheets

METHOD FOR PROFILING THE OUTER CIRCUMFERENTIAL FACE OF CYLINDER LINERS

FIELD OF THE INVENTION

The present invention relates to a method for profiling the outer circumferential face of cylinder liners. In particular, it relates to a method in which the outer circumferential face of the cylinder liners is produced by forming an undercut profile.

BACKGROUND OF THE INVENTION

Nowadays the crankcase of internal combustion engines is generally made of alloyed aluminum in order to minimize the weight. Nevertheless, inexpensive aluminum alloys with good casting and machining properties suffer from the disadvantages of relatively low hot strength and poor wear resistance at the piston running faces of the cylinder bores. Such running faces are therefore unsuitable as direct running partners for pistons equipped with piston rings.

It is known that the wear resistance of piston running faces can be increased by providing cylinder liners, which are generally made from wear-resistant, predominantly ferrous cast material, especially gray cast iron, or from a hypereutectic aluminum-silicon alloy. In this case, however, problems are encountered in fixation of the cylinder liners in the crankcase in a manner that is resistant to displacement and turning. For this purpose, the liners either are inserted into the crankcase after it has been finish-machined, especially by a press-fitting or hot-joining technique, or are embedded in the crankcase while it is being cast with the aluminum alloy.

In the press-fitting technique, fixation is achieved by making the outside diameter of the cylinder liner somewhat larger than the bore provided to receive it in the cylinder block. Press-fitting suffers from substantial disadvantages, however, due to the fact in particular that the cylinder wall or the liner can be damaged or impaired, especially warped, during the press-fitting process. Furthermore, fit sizes that can be exactly adjusted are needed to meet the narrow tolerance on form for the cylinder liner and cylinder-block bore, but they can be easily influenced, in particular by temperature fluctuations or extraneous matter.

In hot-joining of cylinder liners, the necessary force fit is also achieved by an overlap between outside diameter of the cylinder liner and the cylinder-block bore. In the joining process, this oversize is overcome not by mechanical force, however, but instead by exploitation of thermal expansion, for which purpose the cylinder block is heated and the liner is cooled. Nevertheless, hot-joining is also an uncertain production process, to some extent with the same disadvantages as in press-fitting, in addition to which even more time and effort are needed for heating and cooling the components.

Finally, the most reliable production process can be regarded as that in which the cylinder liners are cast in place. In this process, the cylinder liners, made of gray cast iron, for example, are placed in the casting mold of the crankcase and then the aluminum alloy is cast around them. Unless special precautions are taken, however, even this method encounters some technical problems, which occur mainly due to inadequate bonding of the outer surface of the liner to the crankcase material. This will now be illustrated in detail.

If the crankcase is made of aluminum alloy in the die-casting process, and cylinder liners of an aluminum-silicon alloy, obtained in particular by spray-compaction, are cast in place, a very durable and at least partly metallic bond is achieved between cylinder liner and surrounding cast metal due to the turbulent filling of the casting mold. If cylinder liners of gray cast iron are used, however, it is basically impossible to obtain a metallic bond between the aluminum and the gray cast iron. For such cylinder liners, therefore, arrangements must be made for adequate interlocking with the surrounding cast metal.

It is further known that "rough cast liners" can be cast in place, especially in the die-casting process. These are gray cast iron cylinder liners that have the structure of an undressed casting on their outer circumferential face. When the aluminum material of the crankcase is cast around them, mechanical meshing between the aluminum material that has flowed around the rough cast liner and the surface roughness of the liner is developed upon cooling. The use of rough cast liners is limited to pressure-assisted casting techniques, however, since it is only under such conditions of application of an external force during filling of the casting mold and during solidification that the molten metal is pressed completely into the finest cavities of the greatly enlarged rough surface, thus achieving complete interlocking with the surface.

In casting techniques in which filling takes place slowly, as in gravity casting and sand casting, an oxide skin coating the molten metal prevents metallic bonding between the aluminum alloy of the crankcase and the aluminum-silicon alloy of the cylinder liner. This can be prevented by raising the temperature of the molten metal, but then at least partial melting of the cylinder liners also takes place in general. For the purposes of series production, however, the process window for adequate bonding of the two workpieces without at least partial melting of the cylinder liner is not controllable. In the slow-filling casting techniques, therefore, arrangements must be made for adequate interlocking with the surrounding cast metal, both in the case of cylinder liners of aluminum-silicon alloy and in the case of cylinder liners of gray cast iron, where in principle it is impossible to obtain a metallic bond. Because of the inadequate penetration of the melt into the finest cavities of the rough surface, the use of rough cast liners is not a viable option.

To avoid relying on the few cases in which good metallic bonding of the cylinder liner to the crankcase is achieved by casting in place of cylinder liners, it will therefore be necessary in general to make arrangements for adequate interlocking between the aluminum alloy of the crankcase and the material of the cylinder liner, in order in this way to ensure that the cylinder liner is fixed in the crankcase in a manner that is resistant to turning and displacement. This is normally achieved by using shaped elements or by suitable profiling of the outer circumferential face of the cylinder liner.

Such shaped elements are usually formed by machining with metal-cutting techniques, but this is associated with considerable disadvantages. In particular, production of highly advantageous undercuts, for example, is not possible in this way. In addition, such profiling is often accompanied by the development of cracks and fissures, which can lead to impairment of heat dissipation and in unfavorable cases even to loosening of the cylinder liner in the crankcase. Furthermore, although machining by metal-cutting techniques is provided in any case during the production of cylinder liners of gray cast iron or of cast aluminum-silicon alloy and can therefore be accomplished relatively inexpensively, this is not true for the production of cylinder liners from spray-compacted aluminum-silicon alloy, where machining by metal-cutting techniques is not provided in the usual manufacturing steps of spray-compacting, hot extrusion of tubes, hot round kneading and finish-machining. For the very expensive material manufactured by spray-compacting to be economically competitive, it must be amenable to conversion to the end product with the highest possible material yield.

SUMMARY OF THE INVENTION

The object of the present invention is to provide a method wherein the disadvantages of the methods known in the prior art are overcome. According to the invention, there is provided a method for producing, by forming techniques, an undercut profile in the outer circumferential face of cylinder liners to be cast in place in a crankcase, characterized by the following steps.

In the first step of the inventive method, an inner core is introduced into the cavity of a cylinder liner. This inner core is designed to bear bracingly against the inner circumferential face of the cylinder liner. The purpose of the inner core is to prevent deformation of the liner due to the applied forces during subsequent profiling of the outer circumferential face of the cylinder liner. At the same time, the caliber of the core of the cylinder liner can also be advantageously established with the inner core, thus achieving a concomitant improvement of the tolerances.

In the second step, the cylinder liner equipped with bracing inner core is then introduced into a first forming die, whose working faces are provided with a serrated profile. Such a forming die is constructed from a plurality of jaws, which are provided with a serrated profile on the working faces and which are closed radially, relative to a common axis, onto the cylinder liner. These jaws can in particular have the form of segments of cylindrical shells. In their radially inner position, the shells preferably adjoin one another with small spacing, and thus define a substantially closed cylindrical shape. Preferably more than two jaws are provided. The jaws have a profile in the form of ribs oriented axially relative to the cylinder liner. The spaces between these ribs are preferably smaller than the cross-sectional width of the ribs. Furthermore, the ribs and spaces between the ribs are preferably rounded. Nevertheless, the ribs and spaces between the ribs can in principle have any desired cross sectional shape.

In the next and third step, the first forming die equipped with a serrated profile is pressed against the outer circumferential face of the cylinder liner, thus producing a complementary profile in the outer circumferential face of the cylinder liner.

Since the profile of the first forming die has the form of axially oriented ribs, axially oriented furrows are produced as the complementary profile in the outer circumferential face of the cylinder liner. The ridges separating the furrows from one another in the indented profile of the cylinder liner then correspond to the spaces between the ribs in the first forming die. If the space between neighboring ribs in the first forming die is chosen such that it is smaller than the cross-sectional width of these ribs, the cross-sectional width of the ridges in the indented profile of the cylinder liner is advantageously smaller than the cross-sectional width of the furrows.

In the next and fourth step of the inventive method, the cylinder liner equipped with bracing inner core and provided with the complementary profile on its outer circumferential face is introduced into a second forming die equipped with a smooth working surface.

In the fifth and final step, the second forming die equipped with a smooth working surface is pressed against the outer face of the cylinder liner equipped with the complementary profile, thus squashing the complementary profile of the cylinder liner and converting it to an undercut profile. The undercut, profiled cylinder liner can then be removed from the second forming die and, without further machining, can be cast in place in a crankcase. Just as the first forming die, the second forming die comprises a plurality of radially closable jaws, especially in the form of segments of cylindrical shells. As for the first forming die, the jaws preferably adjoin one another in their radially inner position and define substantially a closed cylindrical shape. Preferably more than two jaws are provided in the second forming die.

In a preferred embodiment of the present invention, the first forming die and possibly also the second forming die are used at a temperature above ambient temperature, the cylinder liners and if necessary the forming dies being heated for this purpose. Hereby the profiling process can be facilitated, in that the pressing force applied for profiling can be reduced. Advantageously the temperature of the cylinder liners during use of the forming die or dies is 200 to 420° C.

The undercut profiling of the outer circumferential face of the cylinder liner achieved, purely by forming techniques, according to the invention makes it possible, in all known casting methods, to fix the cylinder liner interlockingly, without gaps and reliably in the crankcase in both axial and radial direction. By means of the inventive method, the bonding in the die-casting method can be advantageously improved even for spray-compacted aluminum-silicon cylinder liners, because interlocking fixation, free of gaps, is achieved in the problem zones in which no metallic bond is developed. In addition, interlocking fixation, free of gaps, can also be achieved very advantageously in slow-filling casting techniques, such as gravity casting or sand casting, without the need to adjust the casting parameters into critical ranges in which melting of the cylinder liner is likely. If the profile of the first forming die is designed such that the spaces between the ribs are smaller than the cross-sectional width of the ribs, the resulting undercuts are relatively thin and can lead not only to interlocking in axial and radial direction but also to additional metallic bonding. The reason for this lies in the fact that the thin ridges of the profile of the cylinder liners melt superficially as metal is being cast around them, and so are able to develop metallic bonding with the surrounding cast metal without the danger that complete melting will occur. Because profiling of the outer circumferential face of the cylinder liner is achieved exclusively by forming techniques, undercut interlocking of the cylinder liner with the crankcase is achieved with great material economy and therefore favorable costs.

DETAILED DESCRIPTION OF THE INVENTION

Figure 1:
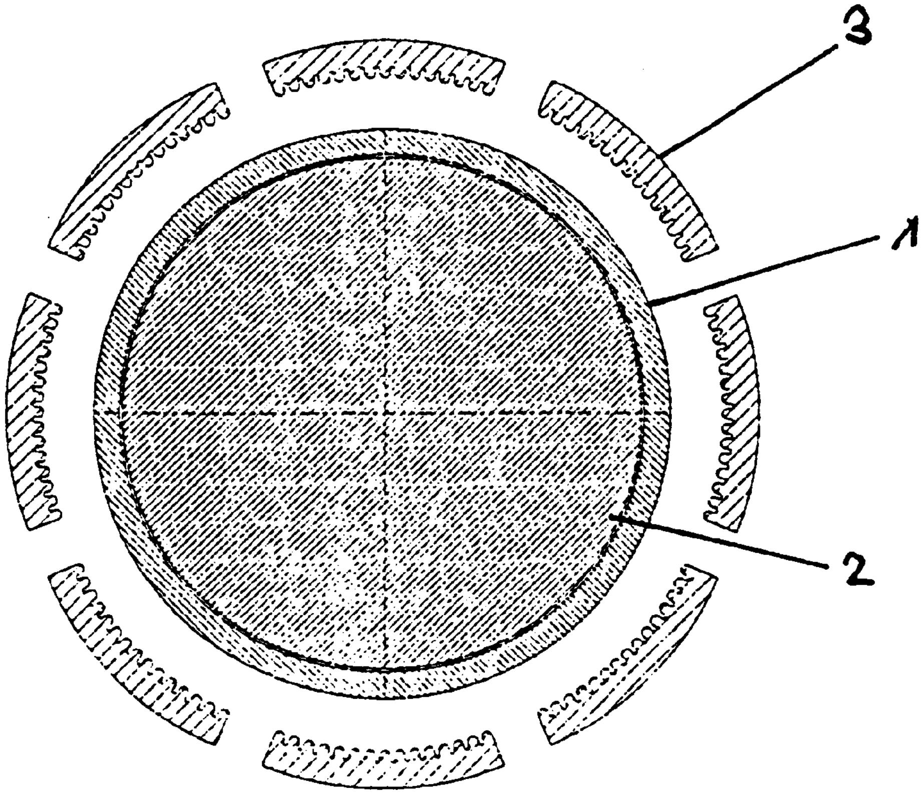
FIG. 1 shows a cross-sectional view of a cylinder liner equipped with an inner core in a first forming die.

Referring first to FIG. 1, there is illustrated in FIG. 1 cylinder liner 1 together with inner core 2, which has been introduced into the cavity thereof in the first step of the inventive method. The inner circumferential face of cylinder liner 1 is braced by inner core 2. Cylinder liner 1 equipped with inner core 2 is disposed in a first forming die in the form of radially closable jaws 3, which are equipped on their working faces with a serrated profile.

Figure 2:
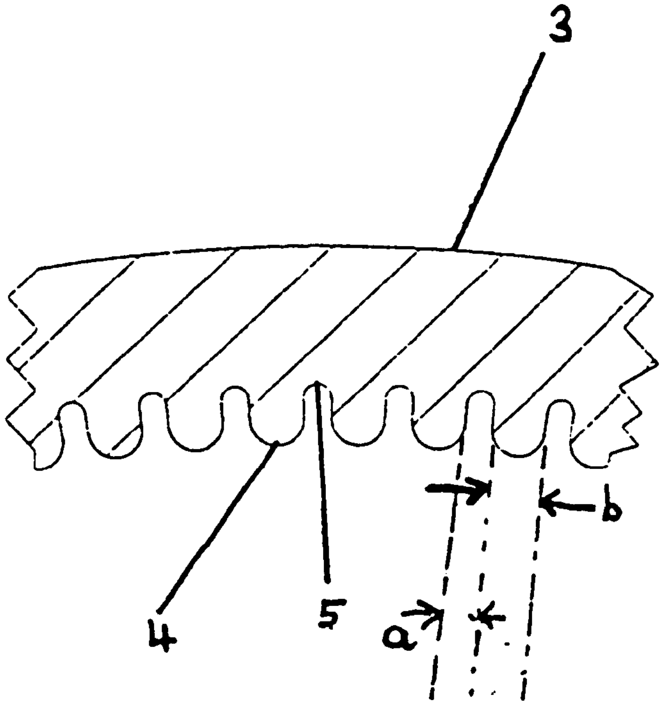
FIG. 2 shows a cross-sectional view of an enlarged detail of the first forming die of FIG. 1.

In FIG. 2 there is illustrated a detail of a jaw 3 of the forming die. The serrated profile of a jaw 3 is composed of a plurality of ribs 4 arranged longitudinally relative to the cylinder axis. Ribs 4 are rounded at their upper ends. Ribs 4 are separated from one another by intermediate spaces 5, which are also rounded. The lateral spacing a of neighboring ribs 4 is chosen such that it is smaller than the cross-sectional width b of ribs 4.

Figure 3:
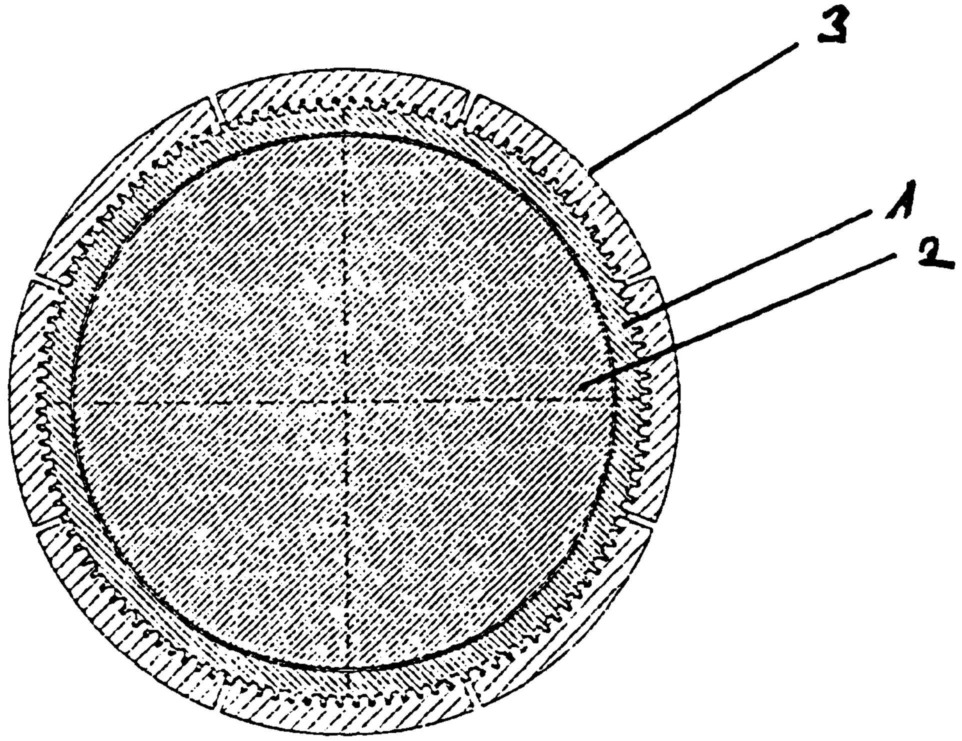
FIG. 3 shows a cross-sectional view of the profiled forming die shown in FIG. 1 in pressing position.

FIG. 3 shows cylinder liner 1 equipped with inner core 2 in the first forming die, wherein jaws 3 equipped with a serrated profile are now illustrated in the position in which they are pressed radially, relative to a common axis, against the outer circumferential face of cylinder liner 1. In their radially inner position, jaws 3 adjoin one another and define substantially a closed cylindrical shape.

Figure 4:
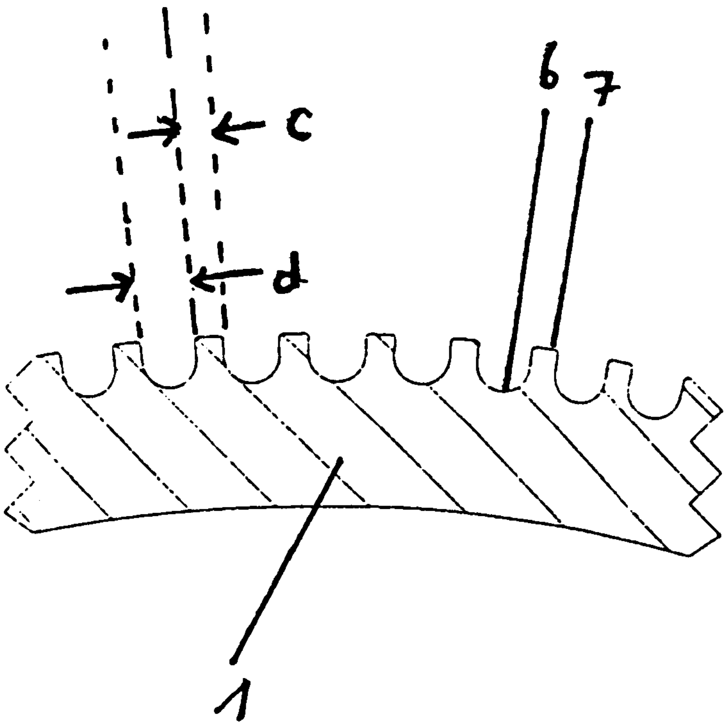
FIG. 4 shows a cross-sectional view of an enlarged detail of the cylinder liner with indented complementary profile of FIG. 3.

In FIG. 4 there is illustrated, as an enlarged detail of the result of the pressing process, cylinder liner 1 with the complementary profile pressed into its outer circumferential face. The complementary profile of cylinder liner 1 is composed of furrows 6 disposed longitudinally relative to the cylinder axis and separated from one another by ridges 7. By virtue of the special geometry of the profile of jaws 3 of the first forming die, there is obtained, on the outer circumferential face of cylinder liner 1, a complementary profile in which the cross-sectional width c of ridges 7 is smaller than the cross-sectional width d of furrows 6 adjoining ridges 7.

Figure 5:
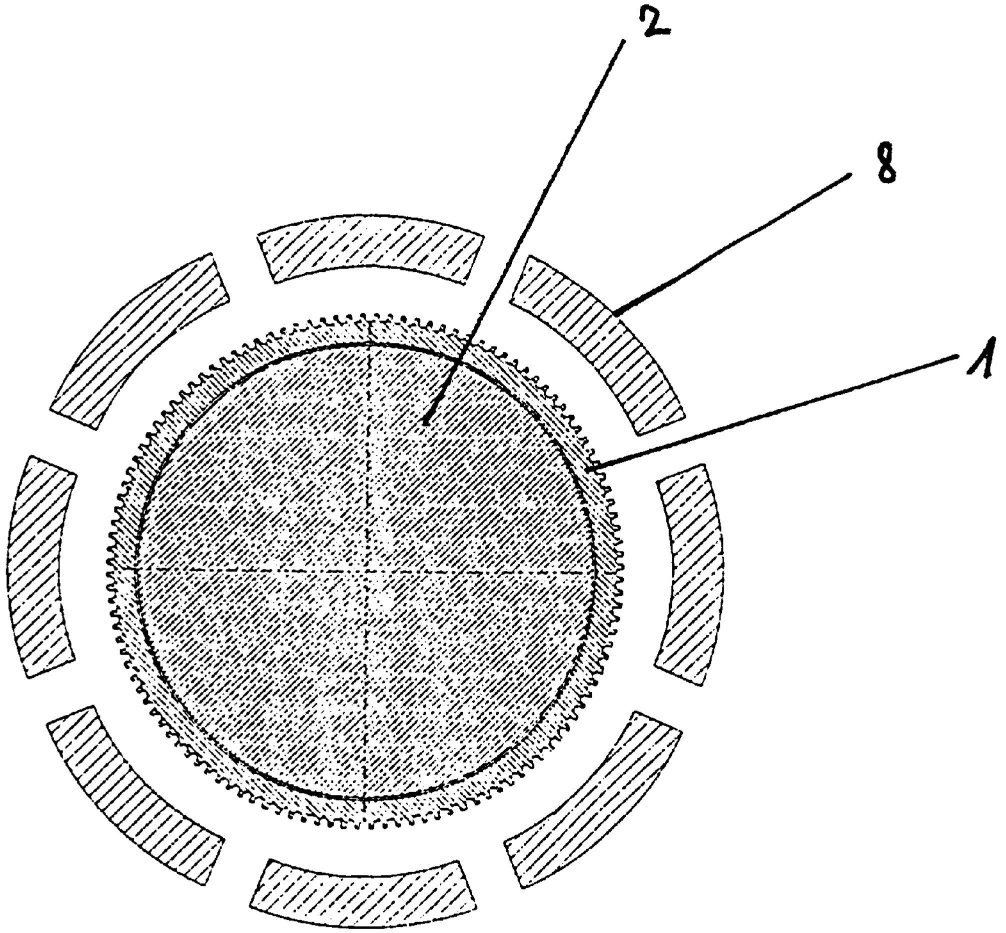
FIG. 5 shows a cross-sectional view of the cylindrical liner equipped with an inner core and provided with a complementary profile in a second forming die equipped with smooth working faces.

In FIG. 5 there is illustrated cylinder liner 1 equipped with an inner core 2 and provided with a complementary profile in a second forming die in the form of jaws 8, which are equipped with smooth working faces and can be radially closed relative to a common axis.

Figure 6:
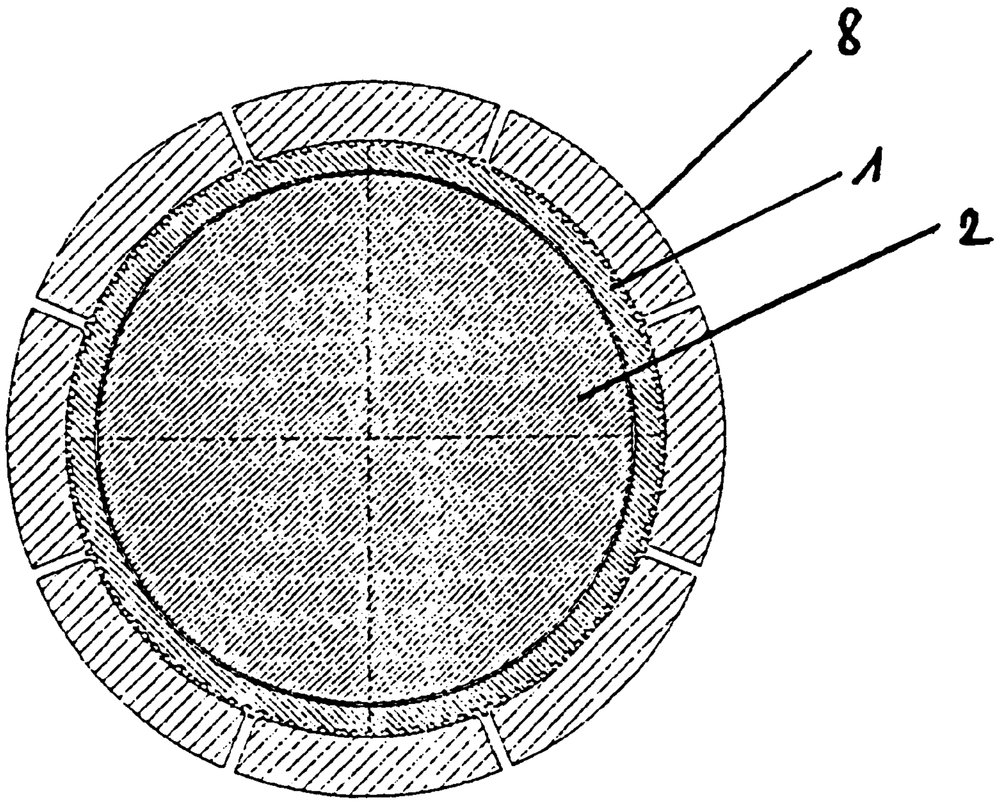
FIG. 6 shows a cross-sectional view of the second forming die with smooth working faces shown in FIG. 5 in pressing position.

FIG. 6 shows cylinder liner 1 equipped with inner core 2 and provided with a complementary profile at its outer circumferential face in the second forming die in pressing position. In their radially inner position, jaws 8 adjoin one another and define substantially a closed cylindrical shape.

Figure 7:
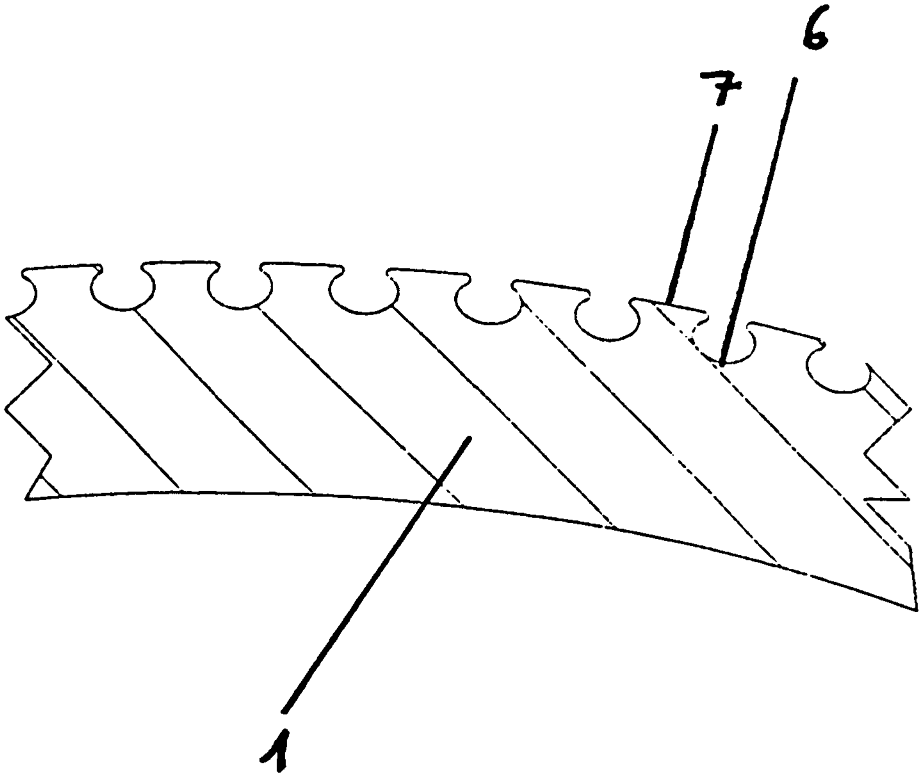
FIG. 7 shows a cross-sectional view of an enlarged detail of the cylinder liner with squashed complementary profile of FIG. 6.

In FIG. 7 there is illustrated, as an enlarged detail of the result of the pressing process of FIG. 6, cylinder liner 1 with the squashed complementary profile on its outer circumferential face. The squashed complementary profile of the outer circumferential face of cylinder liner 1 is composed of undercut furrows 6 disposed longitudinally relative to the cylinder axis and separated from one another by undercut ridges 7. Cylinder liner 1 with squashed complementary profile can be removed from the forming die and cast in place in a crankcase of an internal combustion engine.

We claim:

1. A method for producing, by forming techniques, an undercut profile in an outer circumferential face of a cylinder liner to be cast in place in a crankcase, the method comprising the steps of:

introducing a bracing inner core into a cavity of the cylinder liner;

introducing the cylinder liner equipped with bracing inner core into a first forming die, which is equipped on its working faces with a serrated profile and which comprises a plurality of jaws, which are closed radially relative to a common axis, the jaws being provided with a profile in the form of axially oriented ribs;

pressing the first forming die with its serrated profile against the outer circumferential face of the cylinder liner, thus producing a complementary profile in the outer circumferential face of the cylinder liner;

introducing the cylinder liner equipped with bracing inner core and provided with the complementary profile into a second forming die, which is equipped on its working faces with a smooth surface and which comprises a plurality of jaws, which are closed radially relative to a common axis; and pressing the second forming die against the outer circumferential face of the cylinder liner equipped with the complementary profile, thus squashing the complementary profile of the cylinder liner and converting it to an undercut profile.

2. The method according to claim 1, wherein the first forming die is used at a temperature above ambient temperature.

3. The method according to claim 2, wherein the temperature of the cylinder liner is 200 to 420° C.

4. The method according to claim 1, wherein the cylinder liner is made of gray cast iron.

5. The method according to claim 1, wherein the cylinder liner is made of aluminum or of an aluminum alloy.

6. The method according to claim 5, wherein a cast or spray-compacted, hypereutectic aluminum-silicon alloy is used as the aluminum alloy.

7. The method according to claim 1, wherein the caliber of the bore of the cylinder liner is established by the inner core.

* * * * *